United States Patent
Takeuchi

(10) Patent No.: US 7,514,838 B2
(45) Date of Patent: Apr. 7, 2009

(54) FAN UNIT USING MOTOR EQUIPPED WITH ROTOR UNITED WITH FINS

(75) Inventor: Kesatoshi Takeuchi, Shioziri (JP)

(73) Assignee: Seiko Epson Corporation (JP)

( * ) Notice: Subject to any disclaimer, the term of this patent is extended or adjusted under 35 U.S.C. 154(b) by 450 days.

(21) Appl. No.: 10/569,237

(22) PCT Filed: Sep. 10, 2004

(86) PCT No.: PCT/JP2004/013595

§ 371 (c)(1),
(2), (4) Date: Feb. 22, 2006

(87) PCT Pub. No.: WO2005/027318

PCT Pub. Date: Mar. 24, 2005

(65) Prior Publication Data

US 2007/0007848 A1 Jan. 11, 2007

(30) Foreign Application Priority Data

Sep. 10, 2003 (JP) ............... 2003-318146
Feb. 3, 2004 (JP) ............... 2004-026748

(51) Int. Cl.
*H02K 1/22* (2006.01)
(52) U.S. Cl. ............ 310/268; 318/599; 417/423.7; 290/52; 290/54
(58) Field of Classification Search .......... 310/268, 310/156.32–156.37, 112; 318/599; 417/423.7; 290/52, 54
See application file for complete search history.

(56) References Cited

U.S. PATENT DOCUMENTS 4,491,772 A * 1/1985 Bitting .................. 318/400.04
4,758,751 A * 7/1988 Hosoya et al. ............. 310/41

FOREIGN PATENT DOCUMENTS

| JP | 5-95178 A | 12/1993 |
| JP | 6-46224 A | 11/1994 |
| JP | 8-336257 A | 12/1996 |
| JP | 11-218092 A | 8/1999 |

OTHER PUBLICATIONS

International Search Report and Written Opinion of the International Searching Authority for PCT/JP2004/013595 (in English); dated Dec. 9, 2004; ISA/JP.

* cited by examiner

*Primary Examiner*—Javaid Nasri
(74) *Attorney, Agent, or Firm*—Harness, Dickey & Pierce, P.L.C.

(57) ABSTRACT

A fan unit comprises an electric rotary machine (e.g. electric motor) having a rotor and a fin structure unified with the rotor. The fan unit further comprises a rotation mechanism for rotating the rotor. The rotor is formed to have an opening at a central portion thereof in a direction along which the opening permits fluid to flow. The fin structure is coupled with a peripheral portion of the opening so as to be unified with the rotor. The peripheral portion incorporates the rotation mechanism therein.

13 Claims, 18 Drawing Sheets

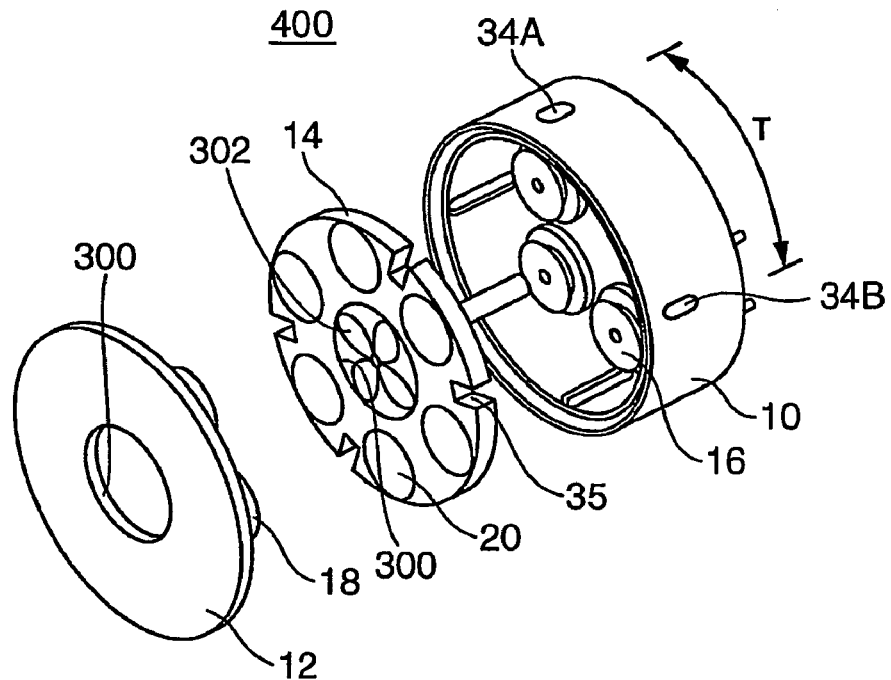
FIG.9A
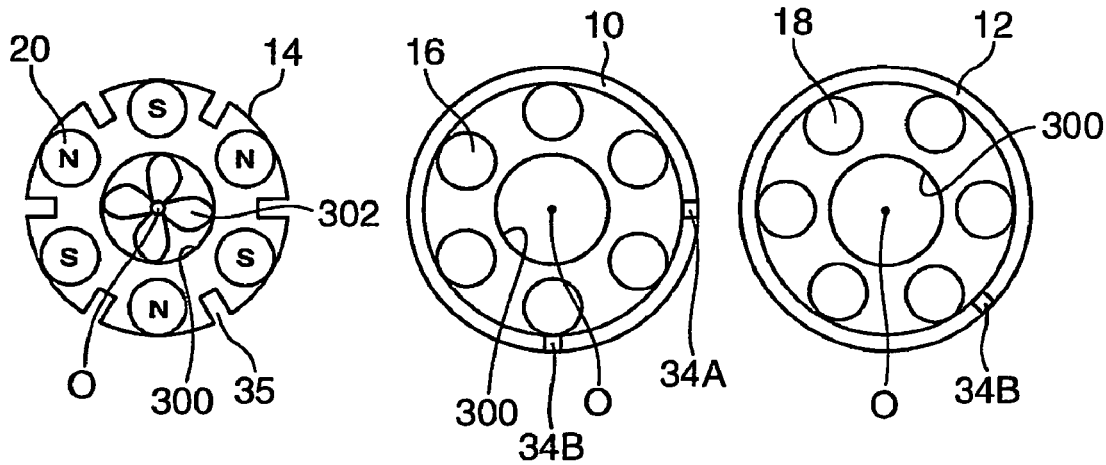
FIG.9B  FIG.9C  FIG.9D

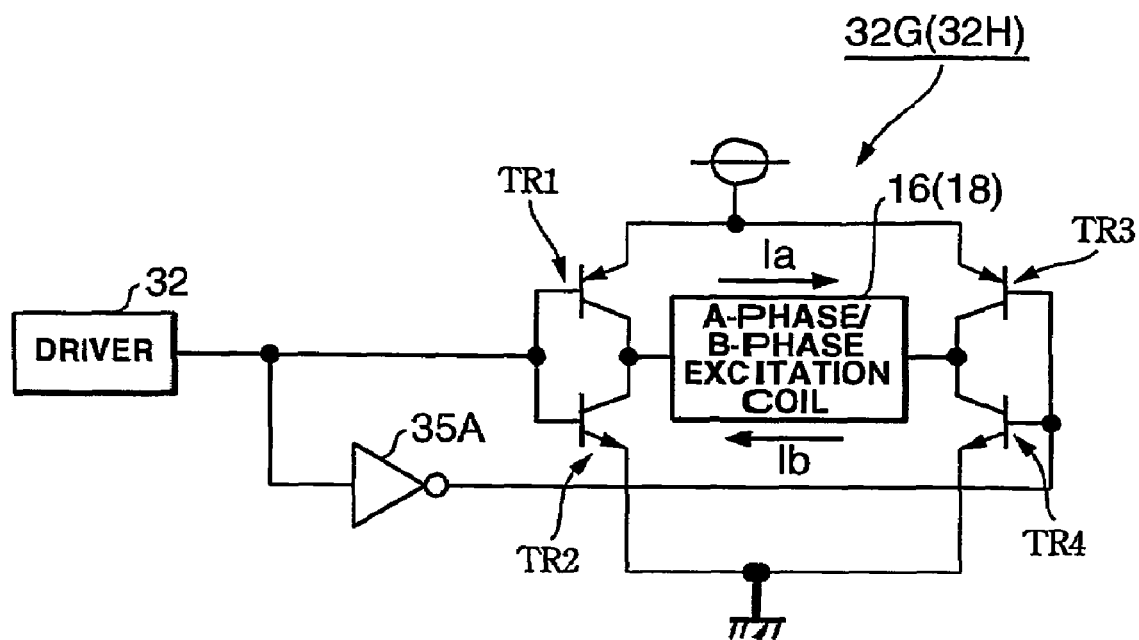
FIG.12
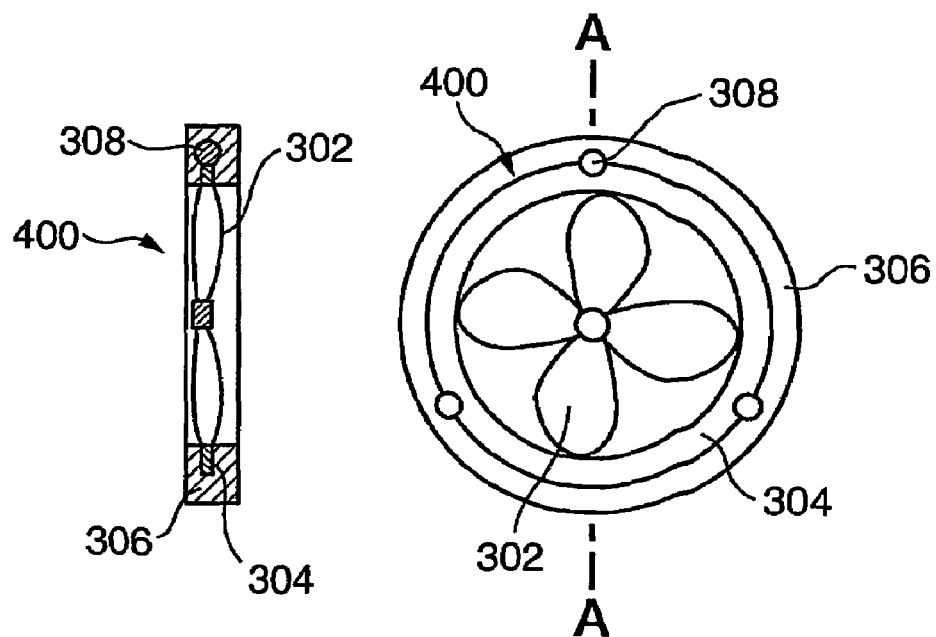
FIG.13B FIG.13A

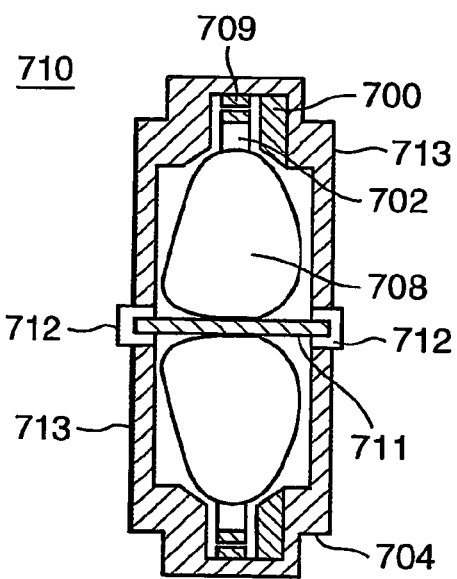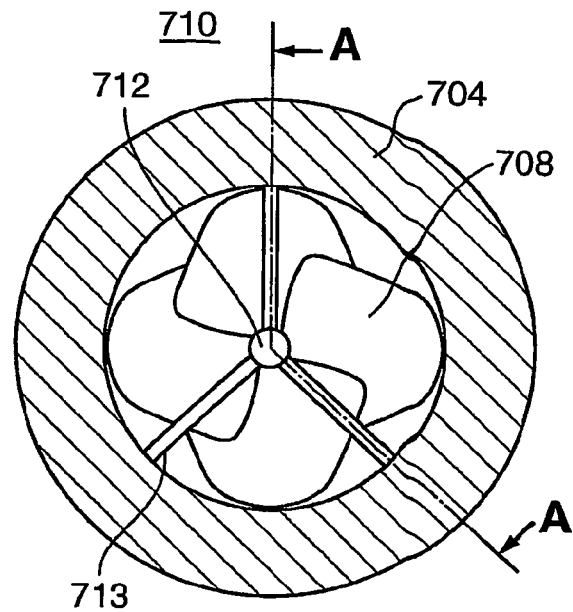
FIG.23A FIG.23B
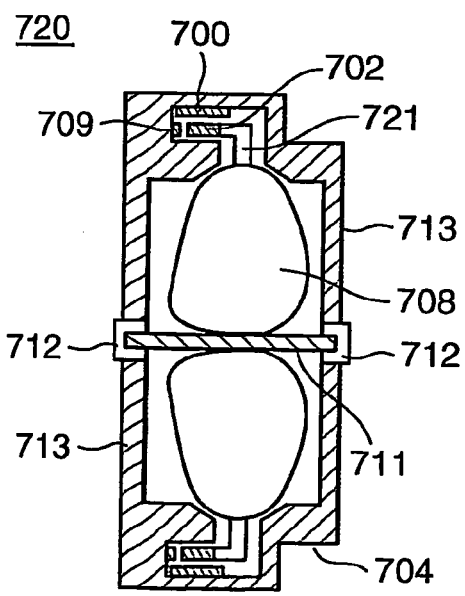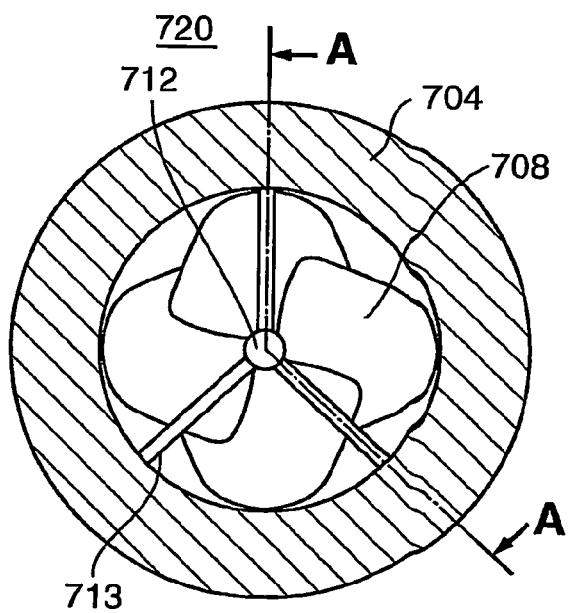
FIG.24A FIG.24B

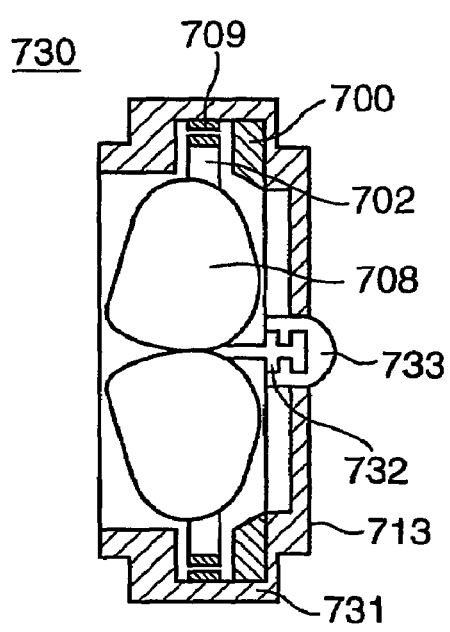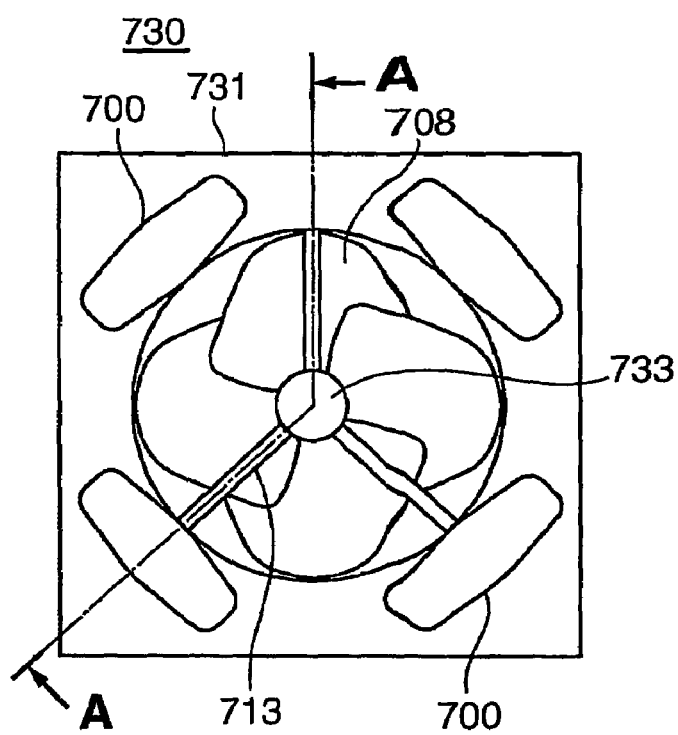
FIG.25A  FIG.25B

FAN UNIT USING MOTOR EQUIPPED WITH ROTOR UNITED WITH FINS

BACKGROUND OF THE INVENTION

1. Technical Field of the Invention

The present invention relates to a fan unit that has various uses including electric vehicles, airships, turbine engines, turbine generators, fuel batteries, air conditioners, heat exchangers, and fluid sensor, and in particular, to the fan unit having a motor equipped with a rotor and fins united with the rotor itself.

2. Related Art

Conventionally, a variety of types of fan units have been used. One type of fan unit has been proposed by Japanese Patent Laid-open No. 11-218092, in which a compact fan with a brushless compact DC motor is explained. Specifically, the fan unit is made compact to the extent of allowing the fan unit to be directly disposed on, for example, a printed wiring assembly. This fan unit has a feature that a brushless DC motor driving a fan wheel is provided as a single-phase single-winding gearing-pole type of motor provided with a non-feedback permanent magnet rotor and at least one magnet for positioning is placed to exert an influence on an activating position of the rotor.

However the above conventional fan unit faces a problem that the motor is obliged to position at the center of a flow path for fluid in which the fan unit is arranged. Hence it is unavoidable that the motor becomes resistance against a flow of fluid.

In addition, due to the fact that the foregoing conventional fan unit has a driving part located in the flow path, there are various other difficulties to the fan unit. For example, there is a reduction in fluid delivery efficiency, fluid loss is easily caused, and the flow path is difficult to be thinner in construction. Moreover, some kind of restrictions in temperature and types of gas and solvent are easily exerted on the fluid. In cases where the driving part becomes a resistance against the flow of fluid and dirt in the fluid adheres to the driving part, the efficiency of fluid flow will suffer a further decrease.

SUMMARY OF THE INVENTION

The present invention has been performed in consideration of the drawbacks that the foregoing conventional fan unit has been suffered. An object of the present invention is to provide a fan unit structure that has a motor serving as means for rotating fins and avoid the motor from becoming resistance to the flow of fluid.

In order to realize the above object, there is provided a fan unit comprising an electric rotary machine having a rotor; and a fin structure unified with the rotor.

Because the fin structure is united with the rotor, so that a mechanism for rotating the motor, that is, the fin structure, can be around an opening formed to allow fluid pass therethrough. Accordingly, there is no need for arranging the rotating mechanism, such as motor, in the opening. Hence the rotating mechanism creates almost no resistance against flow of the fluid passing through the opening.

Applying this fan unit to control of flow of fluid, such as gas and air, makes it possible to transmit and/or compress the fluid at higher efficiency.

Some practical configurations falling into the gist of the above configuration are as follows.

It is preferred that the fan unit further comprises a rotation mechanism for rotating the rotor, wherein the rotor is formed to have an opening at a central portion thereof in a direction along which the opening permits fluid to flow and the fin structure is coupled with a peripheral portion of the opening so as to be unified with the rotor, the peripheral portion incorporating the rotation mechanism therein.

Preferably, the electric rotary machine is provided with a first magnetic member, a second magnetic member disposed to face the first magnetic member with a space therebetween, a third magnetic member disposed between the first and the second magnetic members and configured to relatively movable to both the first and second magnetic members in a predetermined direction in the space, wherein each of the first and second magnetic members has a plurality of electromagnetic coils which are current-excitable and disposed in order along each magnetic member so as to have relative differences in disposal pitches of both of the electromagnetic coils of the first magnetic members and the electromagnetic coils of the second magnetic member, and the third magnetic member has a plurality of permanent magnets magnetized to predetermined magnetic poles and disposed in order along the third magnetic member, the third magnetic member being unified with the fin structure so as to serve as the rotor.

It is also preferred that the fan unit further comprises exciting circuit means configured to supply excitation current to the electromagnetic coils of at least one of the first and second magnetic members.

For example, the exciting circuit means is configured to supply the excitation current to the electromagnetic coils of the first and second magnetic members, the excitation current being set to give the same magnet pole to the electromagnetic coils of each of the first and second magnetic members. In this case, by way of example, the excitation current supplied to the electromagnetic coils of the first magnetic member is different in phase from the excitation current supplied to the electromagnetic coils of the second magnetic member.

BRIEF DESCRIPTION OF THE DRAWINGS

In the accompanying drawings:

FIG. 9A is a perspective view detailing the fan unit according to the embodiment, the fan unit being disassembled;

FIG. 9B is a plan view showing a third magnetic member (i.e., rotor) employed by the fan unit in FIG. 9A;

FIG. 9C is a plan view showing excitation coils (referred to as A-phase excitation coils) on a first magnetic member (i.e., stator) employed by the fan unit in FIG. 9A;

FIG. 9D is a plan view showing excitation coils (referred to as B-phase excitation coils) on a second magnetic member (i.e., stator) employed by the fan unit in FIG. 9A;

FIG. 12 is an electrical circuit showing the configuration of a buffer employed by the driver;

FIG. 13A is a plan view outlining the fan unit to show the entire arrangement configuration thereof;

FIG. 13B is a section taken along an A-A line in FIG. 13A;

FIG. 23A is a plan view showing another example of applications of the fan unit according to the embodiment;

FIG. 23B is a section taken along an A-A line in FIG. 23A;

FIG. 24A is a plan view showing another example of applications of the fan unit according to the embodiment;

FIG. 24B is a section taken along an A-A line in FIG. 24A;

FIG. 25A is a plan view showing another example of applications of the fan unit according to the embodiment; and FIG. 25B is a section taken along an A-A line in FIG. 25A.

DETAILED DESCRIPTION OF PREFERRED EMBODIMENTS

Referring to FIGS. 1A and 1B to 13A and 13B, a fan unit according to an embodiment of the present invention will now be described.

Figure 1A:
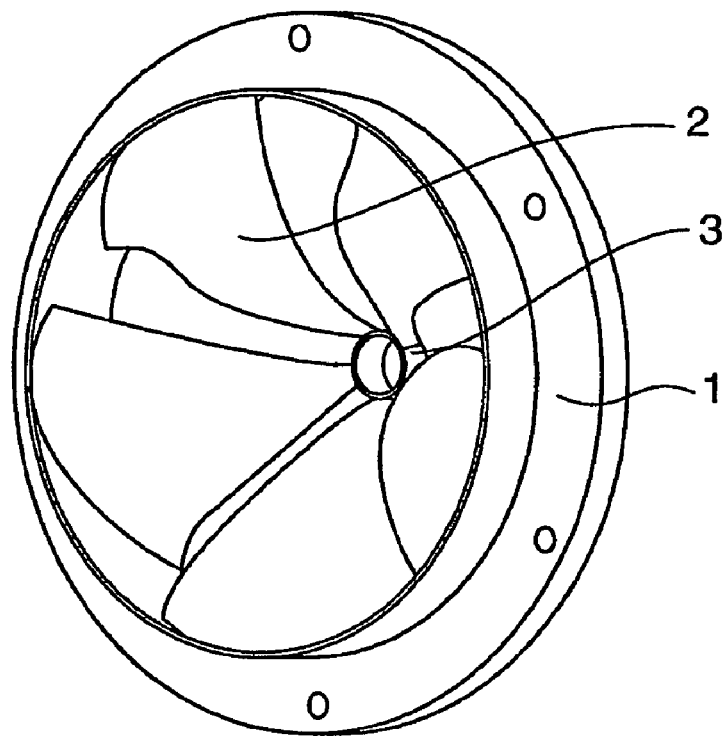
FIGS. 1A and 1B are perspective views of a fan unit according to an embodiment of the present invention.
Figure 1B:
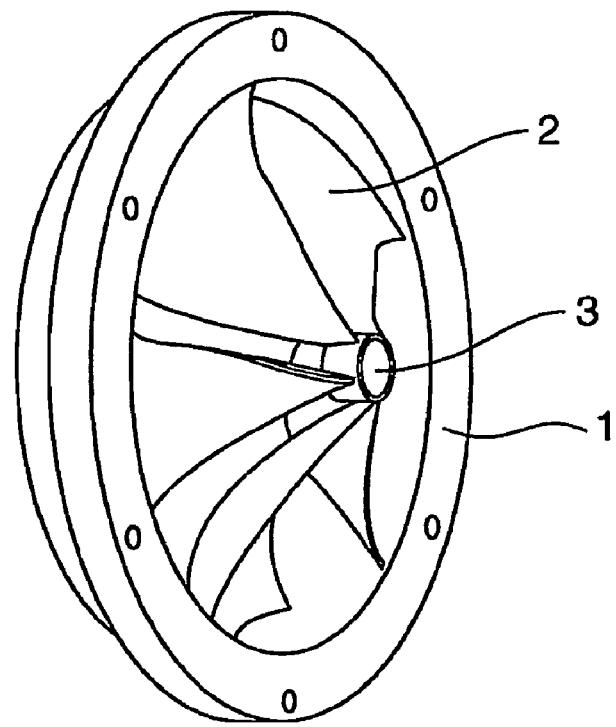

FIGS. 1A and 1B are perspective front and rear views each showing a fin/frame member of the fan unit, respectively.

The fin/frame member, which is structured into a "fin structure," serves as a rotor of a motor (or generator) incorporated in the fan unit. The fin/frame member, which is formed into an annular shape as a whole, has an annular outer frame 1, four fins 2, a boss 3 located at the center of the outer frame 1, all of which are produced as a single unit.

The four fins 2 are formed to connect the outer fame 1 and the central boss 3. In order to make the outer frame 1 work as the rotor of the motor (or generator), a plurality of permanent magnets are used as part of magnetic members in the outer fame 1 so that the magnets make a line, but in an alternately aligned N/S-pole manner, along a circumferential direction of the outer frame 1.

FIGS. 2-5 each illustrate the structure of magnetic members for rotating the rotor (formed into the fin structure as a single unit) according to the present invention and the principle of operation of the magnetic members. The structure of the magnetic members has a first magnetic member (A-phase coil) 10, a second magnetic member (B-phase coil) 12, and a third magnetic member 14 located between the first and second magnetic members 10 and 12. Practically, each of the sets of magnetic members 10, 12 and 14 are disposed in an annular (or arc-like, circular) shape, respectively. As a result, either the third magnetic member or the first and second magnetic members is able to function as the rotor. When considering the configuration shown in FIGS. 1A and 1B, the third magnetic member corresponds to the annular outer frame 1.

The first magnetic member 10 is arranged together with excitation coils 16 that can sequentially be excited into different magnetic poles. The coils are mapped along the first magnetic member 10 at predetermined intervals, preferably at equal intervals. This first magnetic member 10 has an equivalent circuit shown in FIG. 6A or 6B. As will be detailed later in connection with FIGS. 2-5, all of the two excitation coils for the first and second magnetic members 10 and 12 are always subjected to excitation on the already described polarities during the operation ($2\pi$). Accordingly, it is possible to drive and rotate an object to be driven, such as the rotor or a slider, at higher torque.

Figure 6A:
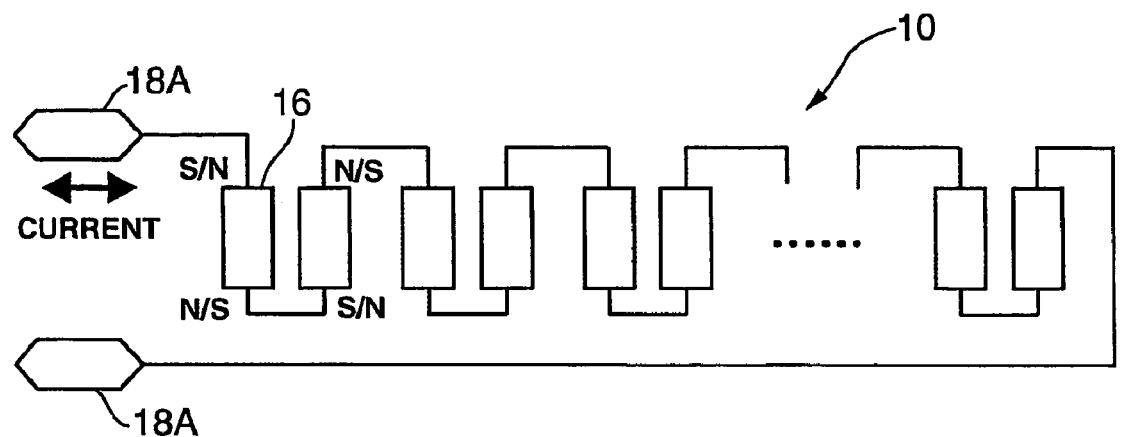
FIGS. 6A and 6B are circuitry showing the electrical connections of excitation coils placed on the magnetic members.
Figure 6B:
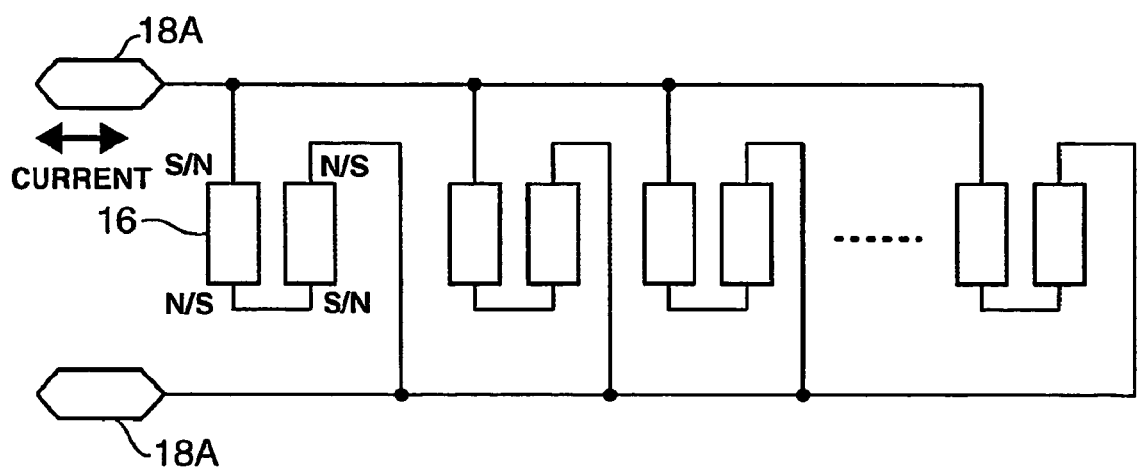

The second magnetic pole 12 also has circuitry equivalent to the circuit shown in FIG. 6A or 6B. That is, the equivalent circuit itself of both first and second magnetic members 10 and 12 are the same, but both members 10 and 12 are excited in mutually different patterns to continuously rotate the rotor. Those excitation patterns are controlled as described later.

As shown in FIG. 6A, the first magnetic member 10 has a plurality of excitation coils 16 connected to an excitation circuit 18A. The plural excitation coils 16, each composes a unit of magnetization, are arrayed at equal intervals in the circumferential direction and connected in series to each other.

The excitation circuit 18A is connected to the excitation coils 16 to provide a pulse current having a predetermined frequency (serving as an excitation pulse signal) thereto. The windings of the respective excitation coils 16 are previously adjusted to have magnetic poles which are different from each other between adjacent excitation coils 16. How to array the excitation coils 16 may be modified as shown in FIG. 6B, in which, of the excitation coils 16, each pair of coils 16 are mutually connected in series and the respective serially-connected pairs are mutually connected in parallel.

The pulse current, which has a frequency capable of switching the magnetic polarities of the excitation coils 16 at predetermined intervals, is fed from the excitation circuit 18A to the first magnetic member 10. In response to the pulse current, the excitation coils 16 arrayed in the circumferential direction exhibit magnetic polarities changing in a certain pattern of N, S, N, . . . at their poles facing the third magnetic member 14, as shown in FIGS. 2-5. When the pulse current fed to the excitation coils 16 is reversed in its polarities, the excitation coils 16 arrayed in the circumferential direction exhibit magnetic polarities changing in the opposite pattern of S, N, S, . . . at their poles facing the third magnetic member 14. Accordingly, the excitation polarity patterns taken on by the first magnetic member 10 can be changed periodically.

The second magnetic member 12 is structured in the similar way to the first magnetic member 10, except that excitation coils 18 arrayed on the second magnetic member 12 are shifted in positions in the circumferential direction, compared to the excitation coils 16 on the first magnetic member 10. That is, the excitation coils 18 on the second magnetic member 12 are arrayed in different pitches from the excitation coils 16 on the first magnetic member 10, so that both coils 16 and 18 are arrayed in a predetermined pitch difference (corresponding to a predetermined angular difference) in the circumferential direction.

It is preferred that this pitch difference is set to a quantity corresponding to a distance through which the third magnetic member 14 (i.e., the permanent magnet) moves relatively to the excitation coils 16 and 18 during one cycle ($2\pi$) of the frequency of the excitation current. In other words, it is preferred that the distance is either the total distance ($2\pi$) of each pair of N and S polarities or ¼ (i.e., $\pi/2$) of the total distance.

The third magnetic member 14 will now be explained. As shown in FIGS. 2-5, the third magnetic member 14, which is disposed between the first and second magnetic members 10 and 12, is provided a plurality of permanent magnets 20 shown by black rectangles in FIGS. 2-5. The plural permanent magnets 20 are aligned at intervals in a linear form or an arc-like form to have their polarities reversed in turn. Preferably, the magnets 20 are arrayed at equal intervals in the circumferential direction. The arc-like form along which the magnets 20 are aligned can be changed into various forms, such as a complete circle, an ellipse, and others (i.e., a closed loop), an uncertain annular structure, a semi-circle, and a sector form.

The first and second magnetic members 10 and 12 are, for example, parallel to each other (with an equal distance therebetween). The third magnetic member 14 is arranged at the middle position between the first and second magnetic poles 10 and 12. The permanent magnets 20 on the third magnetic member 14 are arrayed at equal pitches to the coils 16 and 18 on the first and second magnetic members 10 and 12.

Referring to FIGS. 2-5, the operations of the magnetic member structure consisting of the first, second and third magnetic members 10, 12 and 14 will now be explained.

Figure 2:
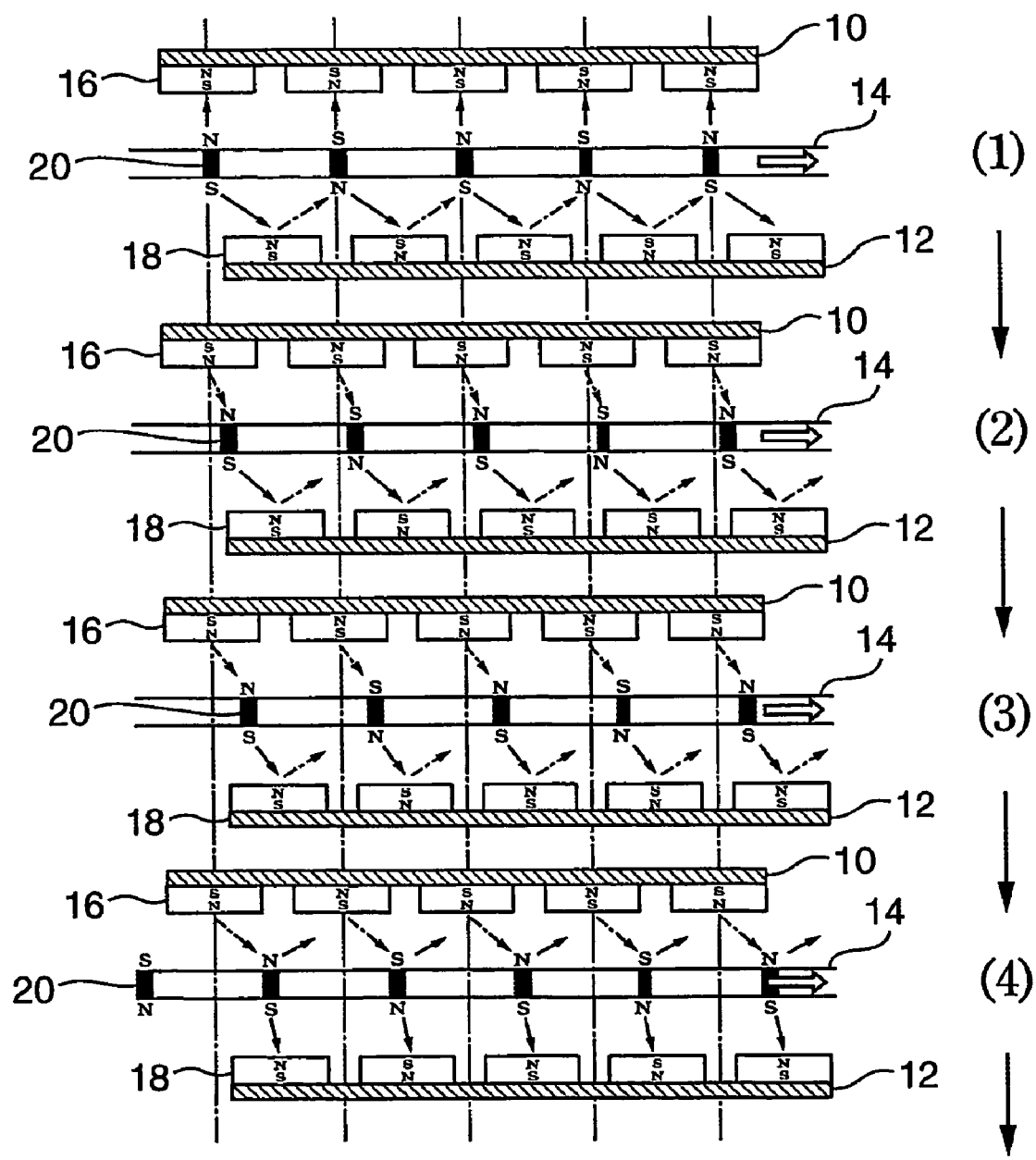
FIGS. 2-5 illustrate the principle of operation of magnetic members employed by the fan unit, together with the structural configuration of the magnetic members.

At a certain time instant, the foregoing excitation circuit 18A (in FIG. 6; which will be detailed later) allows the excitation coils 16 and 18 of the first and second magnetic members 10 and 12 to have polarities according to an excitation polarity pattern shown in a chart (1) in FIG. 2.

At this time, the respective excitation coils 16 on the first magnetic member 10 generate, at their coil ends facing the third magnetic member 14, the magnetic poles in agreement with the pattern of S, N, S, N, . . . , etc. Concurrently with this, the respective excitation coils 18 on the second magnetic member 12 generate, at their coil ends facing the third magnetic member 14, the magnetic poles in agreement with the pattern of N, S, N, S, . . . , etc. In the figure, each solid line arrow indicates an attractive force, while each dashed line arrow indicates a repulsive force.

At the next time instant, as shown in a chart (2) in FIG. 2, the excitation circuit 18A inverses the polarities of the pulse current supplied to the first magnetic member 10. This polarity inversion creates not only repulsive forces between the magnetic poles of the excitation coils 16 of the first magnetic member 10 and those of the permanent magnets 20 on the third magnetic member 14 but also attractive forces between the magnetic poles of the excitation coils 18 of the second magnetic member 12 and those of the permanent magnets 20 on the third magnetic member 14. Such repulsive and attractive forces enable the third magnetic member 14 to move, in the case of the FIG. 2, rightward, as shown in charts (2) to (5) in FIG. 2.

The pulse current fed to the excitation coils 18 of the second magnetic member 12 is different in phase from that to the excitation coils 16 of the first magnetic member 10. Thus, as shown in charts (6) to (8) in FIG. 3, the magnetic poles of the excitation coils 18 of the second magnetic member 12 become repulsive to those of the permanent magnets 20 of the third magnetic member 14, thus further moving the third magnetic member 14 rightward.

Figure 3:
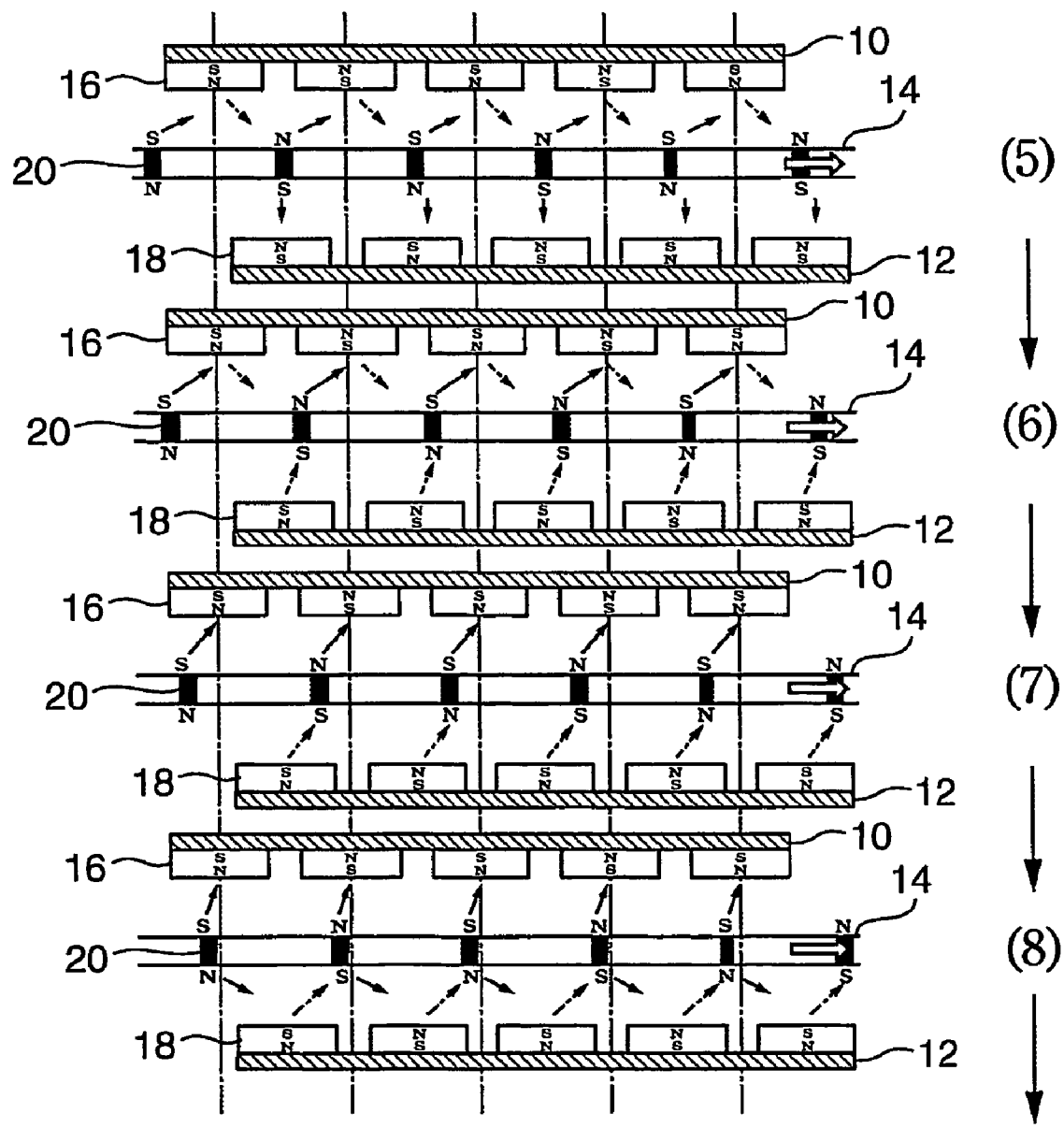
Figure 4:
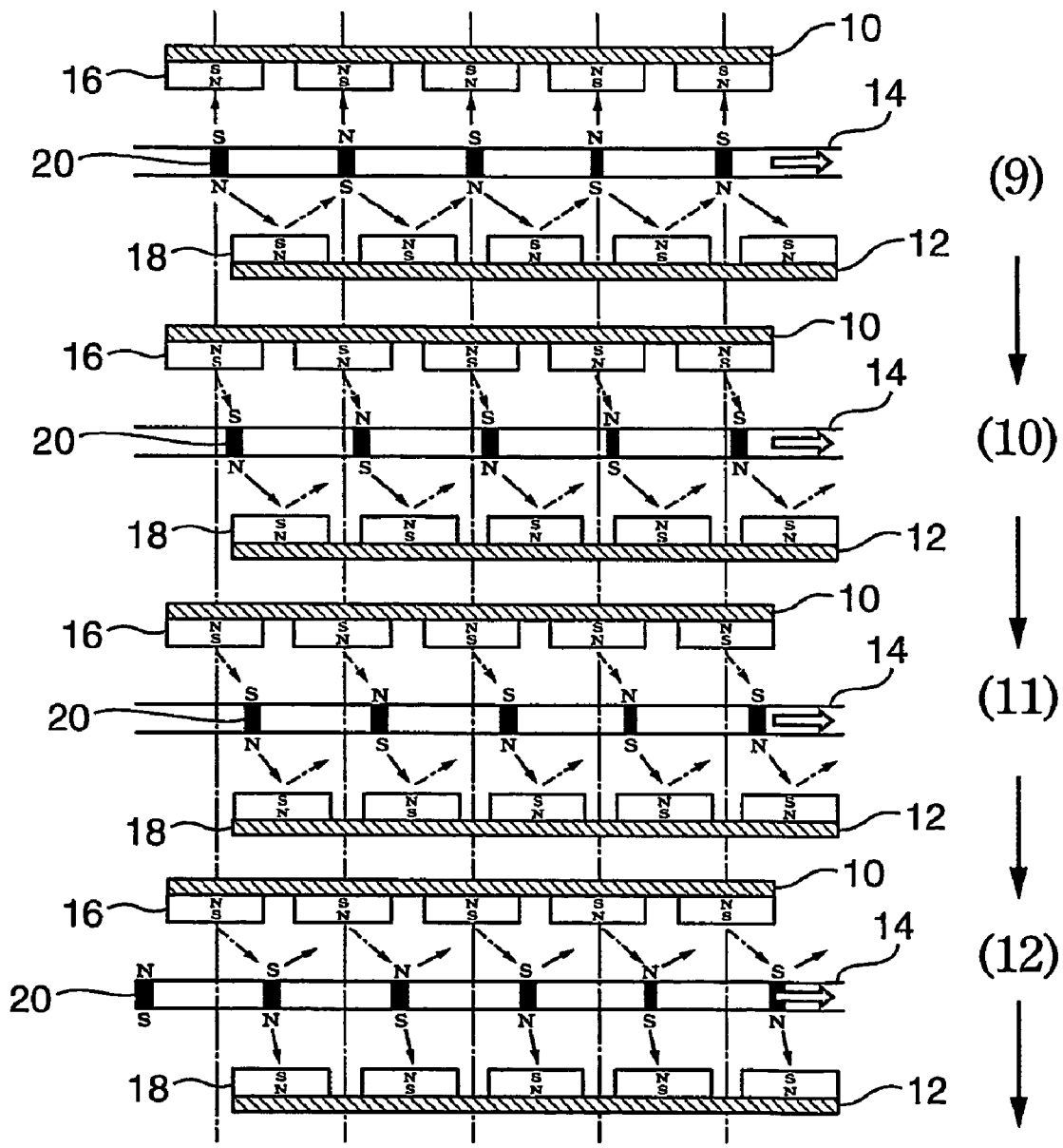
Figure 5:
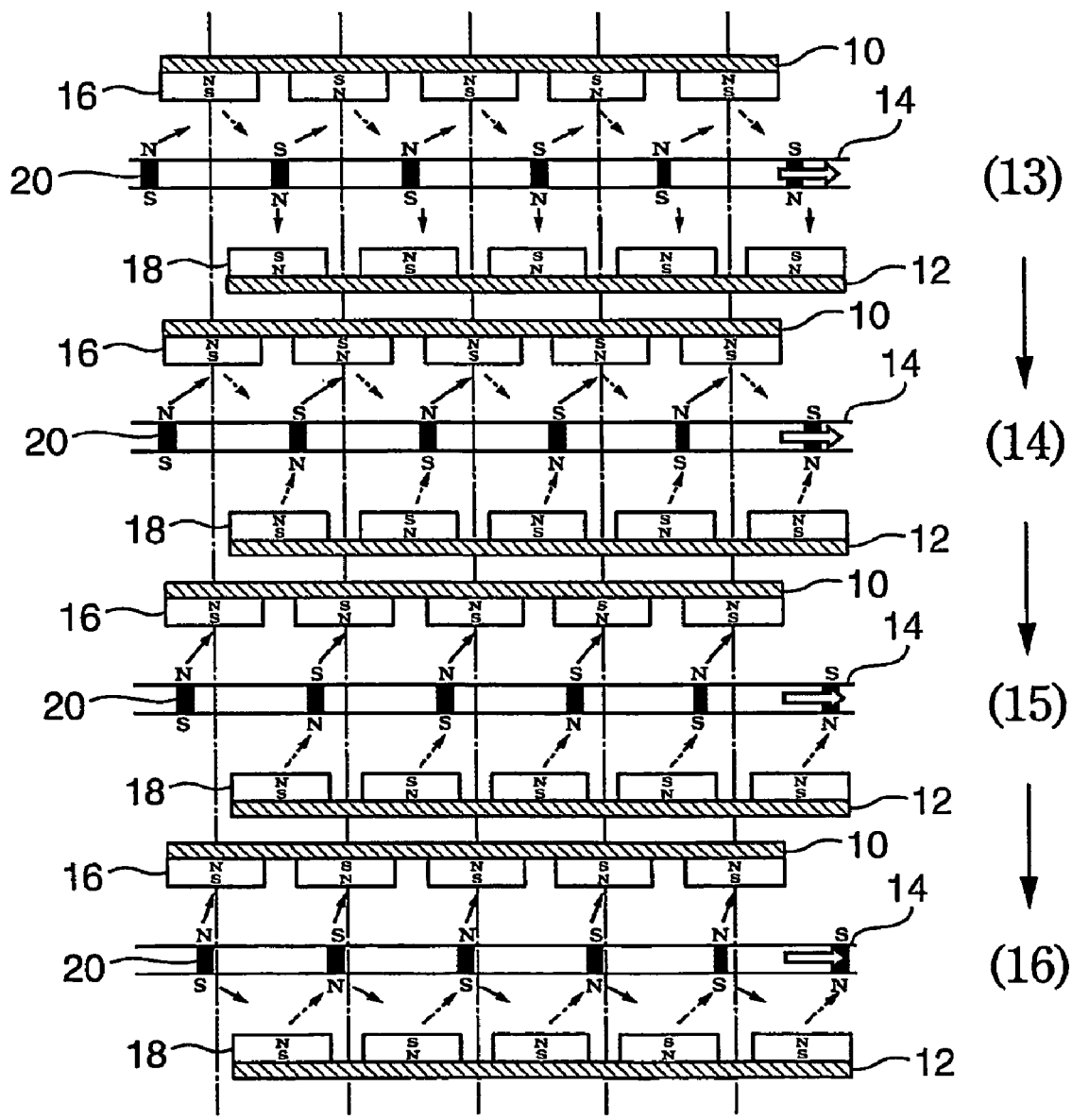

The charts (1) to (8) in FIGS. 2 and 3 illustrate a move of the third magnetic member 14 (i.e., the permanent magnets) along a distance corresponding to a´ radian. Similarly to this, charts (9) to (16) in FIGS. 4 and 5 illustrate another move of the third magnetic member 14 along a distance corresponding to a second´ radian. Hence, the charts (1) to (16) show the third magnetic member 14 which relatively moves to the first and second magnetic members 10 and 12 over a distance corresponding to one cycle (2 ) of the pulse currents, which are fed to the excitation coils 16 and 18 of the first and second magnetic members 10 and 12.

Accordingly, supplying the pulse currents of different phases to the first and second magnetic members 12 and 14 (phases "A" and "B") enables the third magnetic member 14 to rotate as a rotor.

When the first to third magnetic members 12, 14 and 16 are shaped circularly, the fin frame member shown in FIGS. 1A and 1B can be an electric rotary motor. Various components such as casing and rotor, which are other than the permanent magnets and excitation coils, may be formed of conductive materials, but it is preferred that such components are made of lightweight materials including resin serving as nonmagnetic material, aluminum, and magnesium alloy. Employing such lightweight materials leads to rotary electric machines which are lightweight and higher magnetic efficiency and provide open magnetic circuits.

In this magnetic-member structure, the third magnetic member 14 is movable responsively to the magnetic forces from and to the first and second magnetic members 10 and 12. Hence amounts of torque that is a turning force for the third magnetic member becomes greater, being excellent in balance between the torque and the weight. It is therefore possible to provide a compact and lightweight electric motor that can be driven with higher torque.

Figure 7:
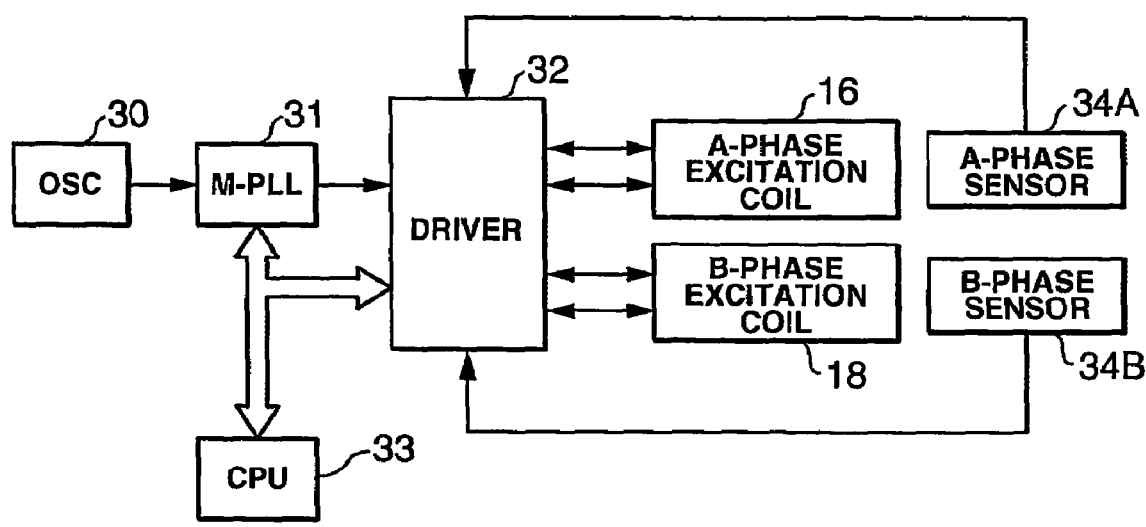
FIG. 7 is a block diagram showing the electrical configuration of an excitation circuit to feeding pulse current to the excitation coils.

FIG. 7 exemplifies a block diagram showing the configuration of the excitation circuit 18A to apply exciting pulse currents to both of the excitation coils 16 (A-phase excitation coils) of the first magnetic member 10 and the excitation coils 18 (B-phase excitation coils) of the second magnetic member 12.

This excitation circuit 18A has a configuration in which pulse signals whose frequencies are controlled are fed to both of the A-phase and B-phase excitation coils 16 and 18, respectively. This circuit 18A is provided, as shown in FIG. 7, a quartz oscillator 30 oscillating a predetermined frequency signal and an M-PLL (phase-locked loop) circuit 31 creating a reference pulse signal by dividing the oscillated frequency signal by an arbitrary integer M.

The excitation circuit 18A is also provided with sensors 34A and 34B consisting of an A-phase sensor 34A and a B-phase sensor 34B. Each sensor 34A (34B) senses a rotary position (angle) of the third magnetic member 14 (i.e., the rotor in the embodiment) and generates a position pulse signal depending on the rotation of the third magnetic member 14. Preferably, a sensing piece incorporated in each sensor 34A (34B) may be a hall element or optical type element.

A plurality of holes (not shown) that equal in the number to the permanent magnets are formed in the rotor. When each hole is positioned right before the sensor 34A (34B) during each rotation, the sensor responds to the arrival of the hole by generating a pulse signal. Incidentally, such holes are unnecessary, provided that a magnetic type sensor is employed as the sensor 34A (34B), where a magnetic sensing element responding to each permanent magnet 20 on the third magnetic member 14 is used.

The A-phase sensor 34A is in charge of sensing the position pulse signal to be supplied to a driver circuit for the A-phase excitation coils 16, while the B-phase sensor 34B is in charge of sensing the position pulse signal to be supplied to a driver circuit for the B-phase excitation coils 18. Both driver circuits are incorporated in a driver 32 shown in FIG. 7. Practically, as illustrated, the position signals (i.e., pulse signals) from both sensors 34A and 34B are sent to the driver for feeding excitation currents to the first and second magnetic members 10 and 14.

In addition, the excitation circuit 18A is provided with a CPU (central processing unit) 33 to control the M-PLL circuit 31 and driver 32.

Figure 8:
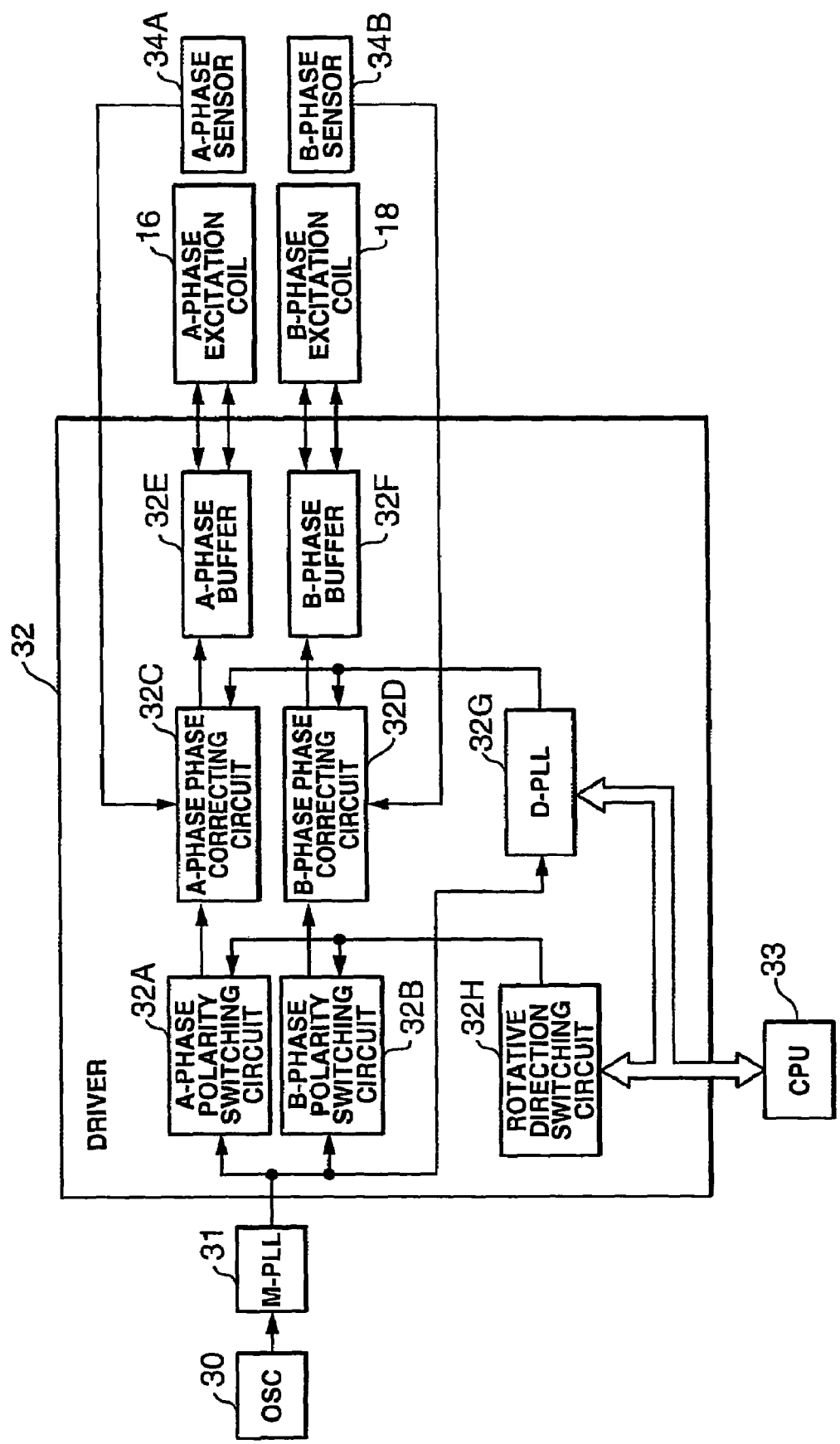
FIG. 8 is a block diagram showing the electrical configuration of a driver employed by the excitation circuit.

FIG. 8 details in block form the configuration of the driver 32, which includes an A-phase polarity switching circuit 32A, B-phase polarity switching circuit 32B, A-phase phase correcting circuit 32C, B-phase phase correcting circuit 32D, A-phase buffer 32E, B-phase buffer 32F, D-PLL circuit 32G, and rotative direction switching circuit 32H.

Provided to this driver 32 from the M-PLL circuit 31 is a reference signal, which is produced by M-dividing the frequency signal oscillated by the quarts oscillator 30. This reference signal is subjected to polarity switching in the A-phase polarity switching circuit 32A, before being supplied to the A-phase phase correcting circuit 32C for controlling its phase. In the similar manner to this, the reference signal from the M-PLL circuit 31 is also subjected to polarity switching in the B-phase polarity switching circuit 32B, and then supplied to the B-phase phase correcting circuit 32D for controlling its phase.

Control signal from the CPU 33 are fed to the rotative direction switching circuit 32H so as to selectively switch the normal rotation (or forward movement) and the reverse rotation (or backward movement) of the rotor (or a slider). This switching circuit 32H operates under the control of the CPU 33 to control the A-phase and B-phase polarity switching circuits 32A and 32B in accordance with CPU-originated commands for the normal/reverse rotations.

The outputs, each showing an angular position of the third magnetic member 14, from the A-phase and B-phase sensors 34A and 34B are fed to the A-phase and B-phase phase correcting circuits 32C and 32D, respectively. In addition, the polarity-switched reference signals from the A-phase and B-phase polarity switching circuits 32A and 32B are fed to the A- and B-phase phase correcting circuits 32C and 32D, respectively. Also supplied to each of the phase correcting circuits 32C and 32D is a signal which is created from the reference signal and the frequency of which is multiplied by a dividing rate of D after lock of the phase in the D-PLL circuit 32J.

The CPU 33 accepts information regarding how to operate this fan unit from a not-shown operation means. The CPU 33 then uses such information to control the rotation speed of the rotor (or the movement speed of a slider) which is actually the third magnetic member 14. For this control, the CPU 33 reads out a desired dividing rate for the parameter M (referred to as M dividing rate) from an internal memory in which a plurality of M dividing rates are mapped in advance. Based on the read-out M value, the CPU 33 changes the frequency of the reference signal. The similar control to the M value is applied to the control of the dividing rate D for the D-PLL circuit 32J, which will be detailed later. These dividing rates are should be changed depending on desired operation characteristics of the third magnetic member 14, such as rotation speeds of the rotor (or movement speeds of the slider). Such operation characteristics are reflected in the previously mapped data in memory tables in the internal memory.

Both of the phase correcting circuits 32C and 32D are responsible for providing the A-phase and B-phase excitation coils 16 and 18 with excitation pulse signals whose phases are mutually differentiated one from the other in a controlled manner This control is required for the rotation (or straight movement) of the third magnetic member 14. Each of the phase correcting circuits 32C and 32D performs the correction by synchronizing the phase of each of the A-phase and B-phase excitation pulse signals with the position pulse signal from each of the A-phase and B-phase sensors 34A and 34B.

Each of the A-phase buffers 32E and 32F serves as circuit means for feeding the phase-corrected excitation signal to each of the A-phase and B-phase excitation coils 16 and 18.

Referring to FIGS. 9A to 9D, the mechanical configuration of the foregoing fan unit serving as an electric motor will now be detailed. FIG. 9A shows a perspective view of a disassembled fan unit; FIG. 9B is a plan view of the rotor (fins); FIG. 9C is a plan view of the A-phase excitation coils (on the first magnetic member); and FIG. 9D is a plan view of the B-phase excitation coils (on the second magnetic member).

The motor (i.e., fan unit) is provided with the paired A-phase (first) and B-phase (second) magnetic members 10 and 12 which serve as a stator of the motor and the third magnetic member 14 serving as the rotor, as desired. The third magnetic member 14 is disposed between the A-phase and B-phase magnetic members 10 and 12, as sandwiched therebetween, with the third magnetic member (i.e. rotor) 14 rotatable about a center axis passing a central point O (refer to FIGS. 9B to 9D).

On the rotor 14, six permanent magnets 20 (refer to FIG. 2, for example) are disposed at equal intervals along a circumferential direction. The polarities of the six permanent magnets 20 are alternately opposite to adjacent one. Similarly to this, six excitation coils 16 are disposed on the stator 10 (the first magnetic member) at equal intervals along the circumferential direction and six excitation coils 18 are disposed on the stator 12 (the second magnetic member) at equal intervals along the circumferential direction. The coils 16 and 18 have also been explained in terms of their functions in for example FIG. 2.

As shown in FIGS. 9A and 9C, the A-phase and B-phase sensors 34A and 34B, which are formed into optical type sensors, are placed on the inner wall of a casing for the first magnetic member 10, with an angular difference of $\pi/2$ [rad] secured between the two sensors 34A and 34B. This angular difference of $\pi/2$ [rad] is determined depending on a predetermined phase difference secured between the two types of excitation pulse signals fed to the A-phase and B-phase excitation coils 16 and 18, respectively.

As described, along the circumferential edge of the disk-like rotor, i.e., the third magnetic member 14, a plurality of holes (notches) 35 are formed at equal angular intervals. In this example, the number of holes 35 is six, which equal to the number of the permanent magnets 20 arrayed at equal intervals along the circumferential direction of the rotor. Each sensor 34A (34B) is equipped with a light emitter and a light receiver. Each hole 35 is configured to be a hole to absorb an emitted light beam or to be filled with a light absorption material. Thus, the emitted light beam from the light emitter is reflected by a portion of the rotor (the third magnetic member 14) other than the holes 35, but absorbed by the holes 35. That is, when each hole 35 is positioned in front of each sensor 34A (34B), the emitted light beam is absorbed and no light reflection is created.

Therefore, during each rotation of the rotor, every time when each hole 35 passes before each sensor 34A (35B), the sensor generates a pulse signal using the fact that there is no light reflection at the position to be detected where each hole 35 is just before each sensor 34A (34B). Hence each sensor 34A (34B) is able to generate a pulse signal, called the position pulse signal, whose frequency depends on both of a rotation speed of the rotor and the number of holes 35.

A circular opening 300 is formed in a central part of each of the rotor 14 and stators 10 and 12, so that a flow of fluid is allowed to pass through. In addition, a set of fins (composing a fan) 302 is attached to the rotor 14 as a one structure thereof and is located to cover the opening 300 of the rotor 14. Thus, the rotation of the rotor 14 directly leads to the rotation of the fins 302 serving as suction means for fluid to pass through the opening 300. Since this configuration allows the fins 302 to be located in a path through which the fluid passes, the fluid can be forcibly suctioned to pass along a predetermined direction through the opening 300.

Figure 10:
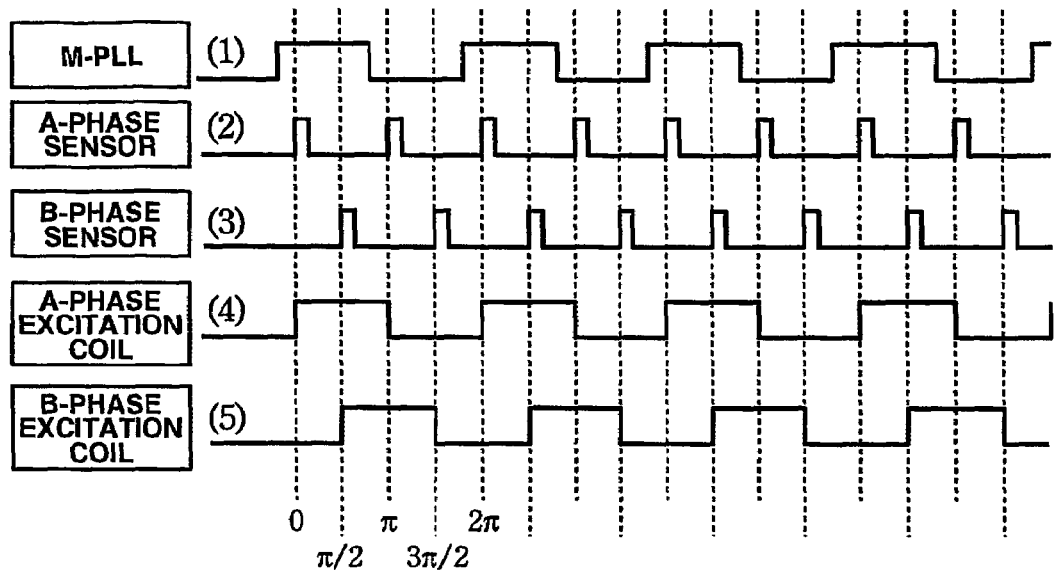
FIGS. 10 and 11 are timing charts of pulse signals showing the processing necessary for exciting the excitation coils, the processing being performed by the driver.

Mechanisms for rotating the rotor, in other words, the foregoing permanent magnets and the A-phase and B-phase excitation coils 16 and 18, are disposed on the rotor 14 and the stators 10 and 12, which are assembled to secure the opening 300 of which center axis serves as a common axis of the rotor 14 and the stators 10 and 12. Hence, the rotation of the rotor 14 causes fluid to be sucked downward through the opening 300. There exists no electric motor in the opening 300, which means that no obstacles to resist the flow of fluid are present in the path FIG. 10 illustrates wave patterns to attain the A-phase and B-phase excitation pulse signals, the processing being conducted by the driver 32. In those wave patterns, the pattern (1) depicts the reference signal, while the patterns (2) and (3) depict the position pulse signals from the A-phase and B-phase sensors 34A and 34B, respectively. As described, both A-phase and B-phase sensors 34A and 34B are located on the motor so that there is a particular difference in the phases of the detected position pulse signals. In the example shown in FIG. 10, such a phase difference is $\pi/2$.

The foregoing A-phase phase correcting circuit 32C executes a known PLL control to synchronize the phase of the detected position pulse signal (wave pattern (2)) from the A-phase sensor 34A with that of the reference pulse signal (wave pattern (1). As a result, a pulse signal to excite the A-phase excitation coils 16, which is shown in the pattern (4), is produced and sent to the A-phase buffer 32E. The buffer 32E has a switching transistor circuit to receive, from the phase correcting circuit 32C, the pulse signal of a particular frequency to perform the PWM control on the signal.

The B-phase phase correcting circuit 32D is configured to operate in the same way as above. The wave pattern (5) in FIG. 10 shows a pulse signal of a particular frequency, which is outputted from the B-phase phase correcting circuit 32D to the B-phase buffer 32F for the B-phase excitation coils 18. As compared between the wave patterns (4) and (5), there is a relative phase difference of $\pi/2$ between the excitation pulse signals fed to the A-phase and B-phase excitation coils 16 and 18, respectively.

Figure 11:
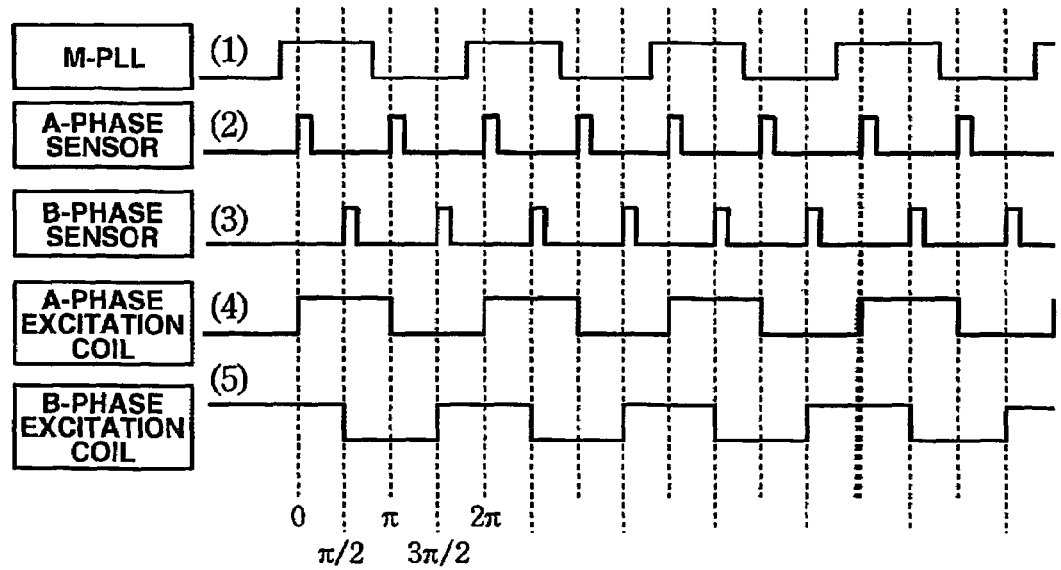

FIG. 11 shows wave patterns necessary for inversing the rotation of the motor (or movement of the slider), in which wave patterns (1) to (5) illustrated therein correspond to the wave patterns (1) to (5) in FIG. 10. As clear from the comparison between the wave patterns in FIGS. 10 and 11, there is only a difference concerning the excitation pulse signal to be fed to the B-phase excitation coils 18. Specifically, the polarity of the excitation pulse signal is inverted one from the other, as shown by the wave patterns (5) in FIGS. 10 and 11. When the excitation pulse signal is changed from the pattern (5) in FIG. 10 to that in FIG. 11, a braking force is applied to the rotation (or sliding) executed under the control of the wave patterns in FIG. 10.

FIG. 12 details each of the foregoing A-phase and B-phase buffers 32E and 32F. This buffer has circuitry including a set of switching transistors TR1 to TR4 and an inverter 35A, which are responsible for producing the excitation pulse signal to be applied to each of the A-phase and B-phase excitation coils.

Let assume that a logical signal of "H" is applied to the buffer shown in FIG. 12. This signal application causes the transistors TR1, TR2, TR3 and TR4 to turn off, turn on, turn on, and turn off, respectively, resulting in an excitation pulse current Ib (refer to an arrow Ib) through the A-phase or B-phase excitation coils 16 or 18.

In contrast, when a logical signal of "L" is applied to the buffer shown in FIG. 12, the transistors TR1, TR2, TR3 and TR4 are turned on, turned off, turned off, and turned on, respectively. Accordingly, an excitation pulse current Ia that is opposite in the direction to the foregoing current Ib (refer to an arrow Ia) flows through the A-phase or B-phase excitation coils 16 or 18. In consequence, the excitation patterns for the A-phase and B-phase excitation coils 16 and 18 can be changed alternately, as described before.

In the present embodiment, the shape of the rotor and/or stator, that is, the third magnetic member 14 and/or the first and second magnetic members 10 and 12 have been explained as having circular contours. However, this is not a definitive list, but those members may have arch-like contours or elliptic contours. Further, the number of holes 35 may also be changed to another value, not limited to the value which is equal to the number of permanent magnets. By way of example, the number of holes may be one or more.

FIGS. 13A and 13B show a fan unit 400 employing the foregoing various structures like the fin/frame structure and rotation mechanisms, but the fan unit 400 is drawn in a simplified manner. FIG. 13A is a plan view of the fan unit along the axial direction, while FIG. 13B is a sectional view taken along an A-A line in FIG. 13B. In those figures, a reference 304 depicts a frame portion (including the annular outer frame 1 shown in FIGS. 1A and 1B), a reference 306 depicts a guide, and references 308 depict bearings. Within the frame portion 304, a plurality of the permanent magnets 20 are arrayed along the circumferential direction, which are shown in FIG. 9. The frame 304 is supported along the guide 306 using the bearings 308.

Figure 14:
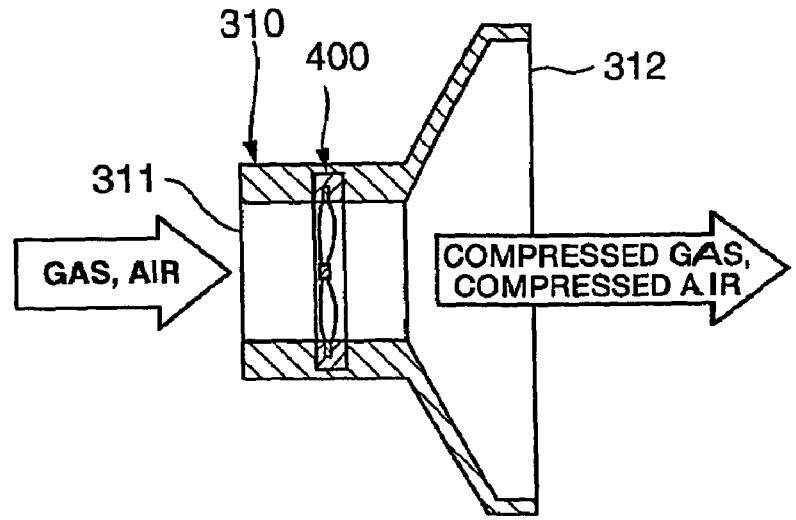
FIG. 14 illustrates an example of applications of the fan unit according to the embodiment.

FIG. 14 shows one example of practical applications of the fan unit 400. In this example, the fan unit 400 is applied to a duct 310 having an inlet 311 and an outlet 312 of which diameter is made larger. A single fan unit 400 is placed in the course of the duct 310. When the foregoing A-phase and B-phase excitation pulse signals are produced in the fan unit 400, the rotor with the fins are rotated. Thus fluid such as gas or air is drawn in through the inlet 311 and forcibly sent out from the outlet 312.

Figure 15:
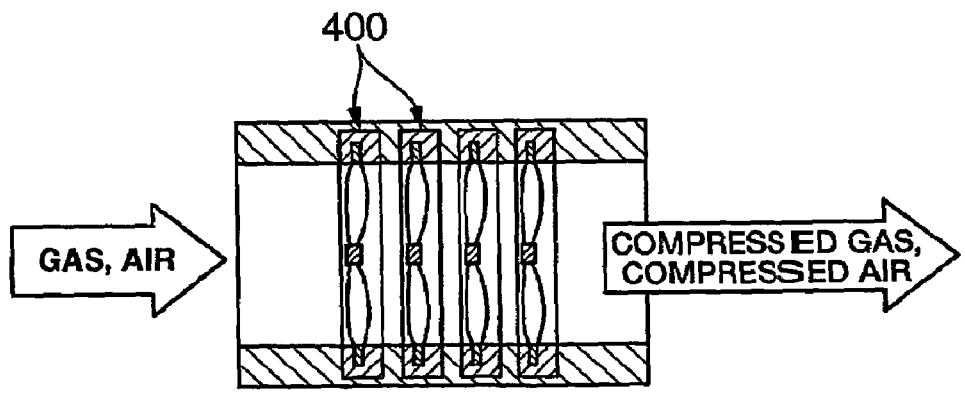
FIGS. 15 to 16 illustrate other examples of applications of the fan unit according to the embodiment.

FIG. 15 shows another example of practical applications of the fan unit 400. This example uses a plurality of fan units 400 along the same fluid path, which is different from the configuration shown in FIG. 14. As shown in FIG. 15, the plural fan units 400 (for example, four units) are aligned in series along the duct path so as to constitute a multiple-stage fin structure.

Figure 16:
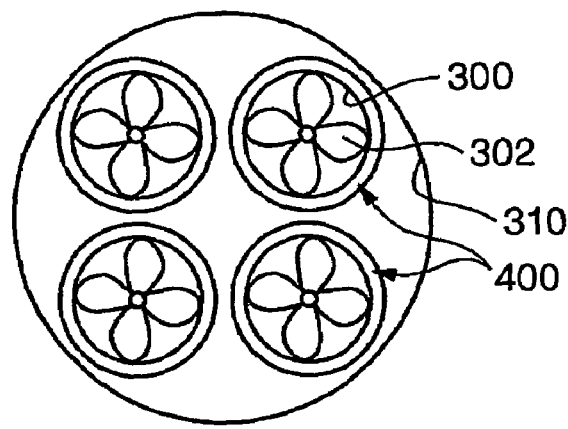

FIG. 16 shows another example. This example is similar to that in FIG. 15 in that the plural fan units 400 are used. However, in this example, those fan units 400 are combined into a single plate to constitute a multiple parallel fin structure. Both structures in FIGS. 15 and 16 can be combined with each other.

Figure 17B:
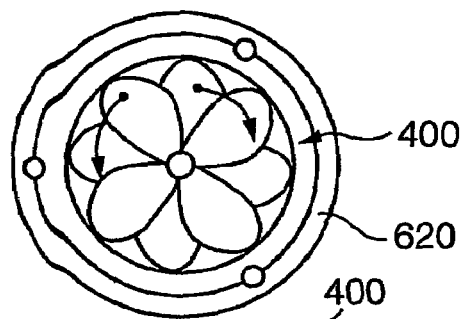
FIG. 17B is a section taken along an A-A line in FIG. 17A.
Figure 17A:
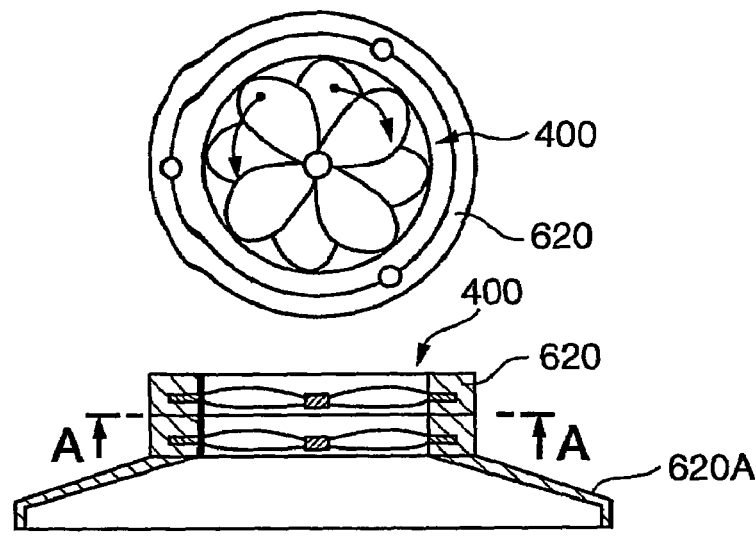
FIG. 17A is a sectional view showing another example of applications of the fan unit according to the embodiment.

FIGS. 17A and 17B show another example, in which two fan units 400 each composed of the foregoing one are placed in series in a duct 620, close to a duct opening 620A of the duct 620.

Figure 18A:
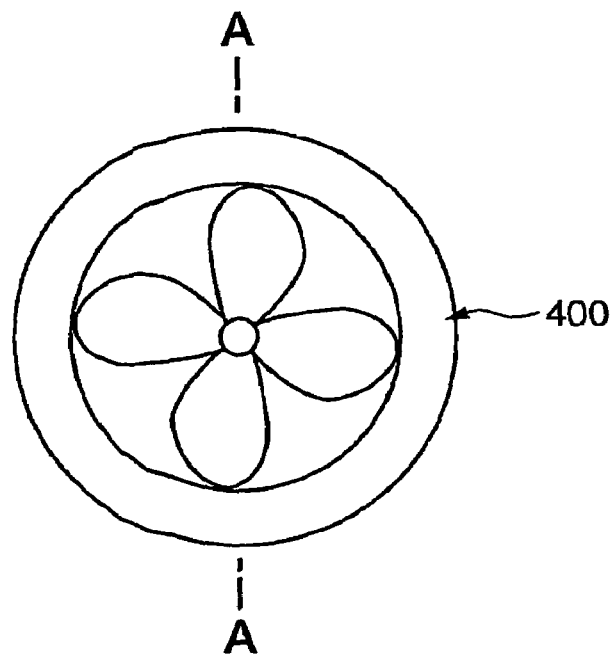
FIG. 18A is a plan view showing another example of applications of the fan unit according to the embodiment.
Figure 18B:
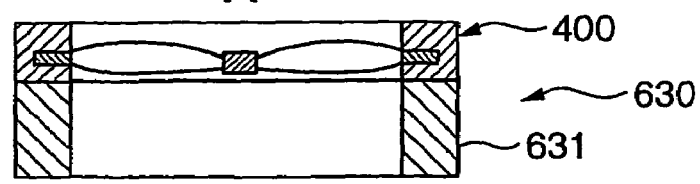
FIG. 18B is a section taken along an A-A line in FIG. 18A.

FIGS. 18A and 18B show another application, in which the foregoing fan unit 400 is applied to an airship 630 having a weight part 631. The fan unit 400 serving as a floating part is placed on the weight part 631.

In the foregoing embodiments and its various applications, by stopping supplying the excitation pulse currents to both A-phase and B-phase excitation coils, dynamic braking control is carried out by the rotations of the rotor. Additionally, since the rotor is rotated on magnetic force, the fan unit can be applied to a path through which explosive gas flows. The structure of the motor to rotate the rotor is not limited to the foregoing one.

The foregoing explanations are directed to the rotation of fins to generate flow of fluid to be targeted, but the opposite way to the above can also be realized. In other words, it can be configured such that the fan unit 400 is forcibly driven by incoming fluid, whereby the fan unit 400 is able to serve as a generator. Additionally, an integrated application is also possible. For example, the A-phase excitation coils are used as a generator, while the B-phase excitation coils are used for control of rotary load. In this configuration, even when the fins encounter a sharp fluctuation in fluid flow, the load control done by the B-phase excitation coils gives a constant number of rotations of the fan unit 400, thus easily generating stable voltage.

Figure 19:
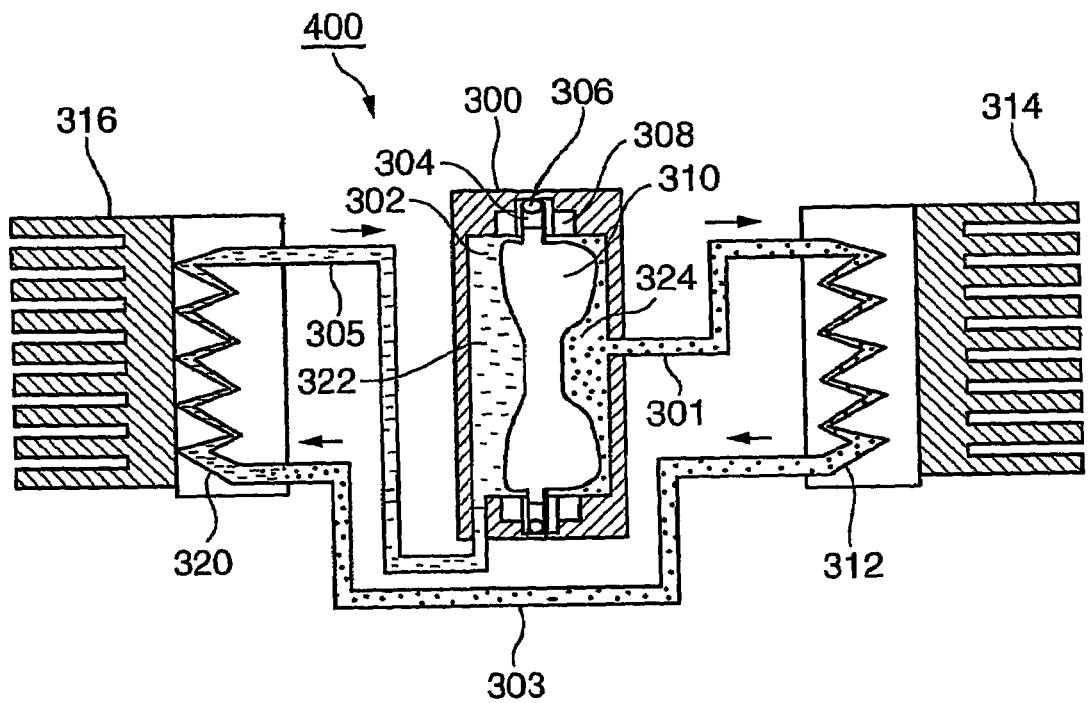
FIGS. 19 to 22 still illustrate other examples of the fan unit according to the embodiment.

FIG. 19 also shows an application, in which a heat exchange system is constructed by using the foregoing fan unit. In this heat exchange system, there are provided a housing 300 in which a rotor 310 with fins are rotatably contained. The periphery part of the rotor 310, which is rotatably supported by bearings 306 attached to a recess formed on the housing 300, is composed of a plate part with permanent magnets 304. The front and rear of the periphery part, which is an array of the permanent magnets 304, are respectively opposed excitation coils 308 disposed on both inner walls of the recess of the housing 300. The bearings 306 are made of ceramics, which are non-magnetic members which can be excluded from magnetic loads.

The rotor 310 in the housing 300 acts as a compressor, which pressurizes material to be heat-exchanged (such as alternative Freon) in an upper section 322 and sends the pressurized material into an adjacent lower section 324. This lower section 324 is connected to a heat exchanging device 312 via a path 301, for discharging heat accumulated in the pressurized material. The heat exchanging device 312 is combined with warming fins 314. The heat exchanging device 312 is connected to a further heat exchanging device 320 via a path 303. This heat exchanging device 320 is combined with cooling fins 316. While the material passes the heat exchanging device 320, the material absorbs environmental heat to evaporate, and the evaporated material returns to the upper section 302 via a path 305. In this heat exchange system, the rotor 310, that is, the fins, is rotatably supported between the two mutually opposed arrays of excitation coils. Accordingly, both of the support and the drive of the fins can be combined into one structure member, thus making both fins and housing compact. When this cooling system is applied to imaging apparatuses such as projectors, the cooling operation can be more effective, compared to the existing ones.

Figure 20:
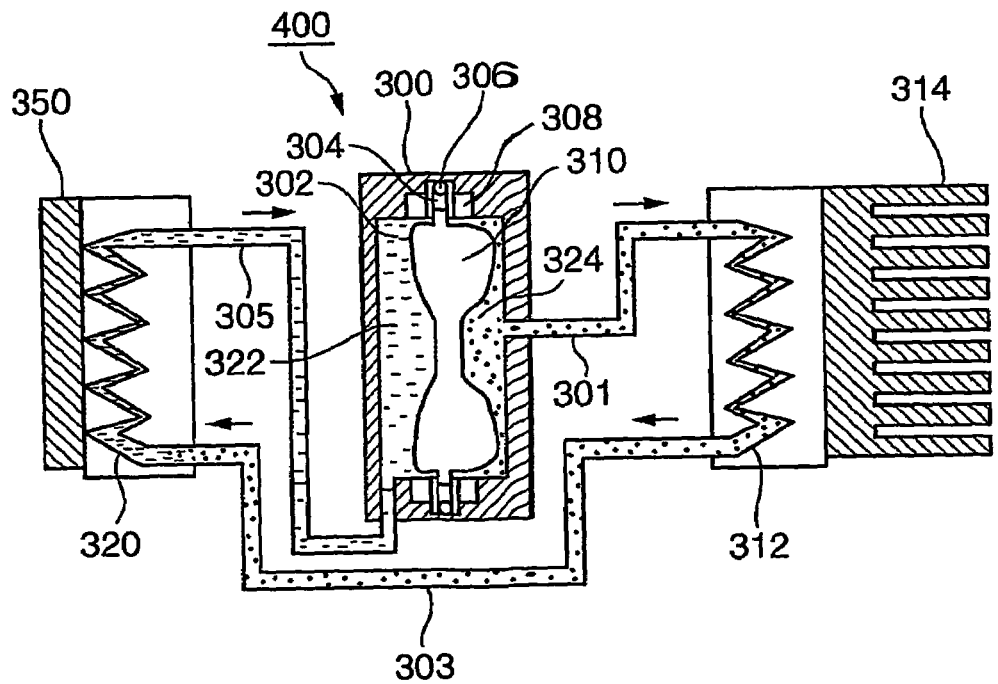

FIG. 20 shows another application which is similar to that in FIG. 19 except that the cooling heat exchanging device 320 is applied to a heat source 350 of an electronics device. Hence the heat source, such as light source and semiconductor circuit, can be cooled effectively.

Figure 21:
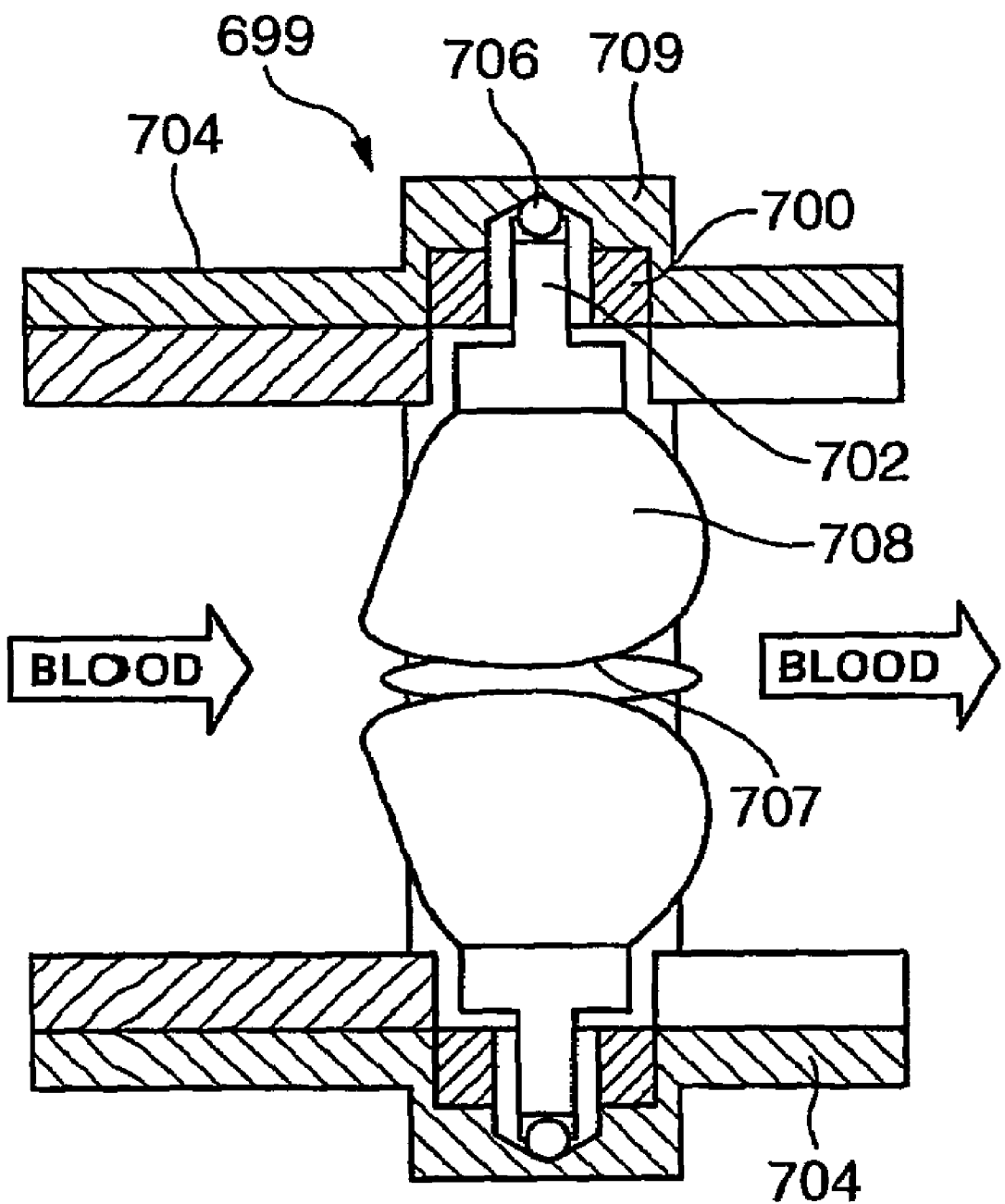

FIG. 21 shows another application, in which the foregoing fan unit 699 is also used. That is, between mutually opposed two stators 700 with excitation coils, a rotor 702 with permanent magnets is rotatably supported by baring 706 placed on a housing 704. Large-size fins 708 are attached to the rotor 702. An opening 707 is formed through the rotor 702 at a central part thereof. Making the fins 708 compact will lead to a pump for circulating blood, which can be applied to the human body. The rotation of the rotor 702 (i.e., the fins 708) causes blood to flow downstream through the opening 707. A sensor 709 to detect the rotary position of the rotor 702 is secured to the housing 704.

Figure 22:
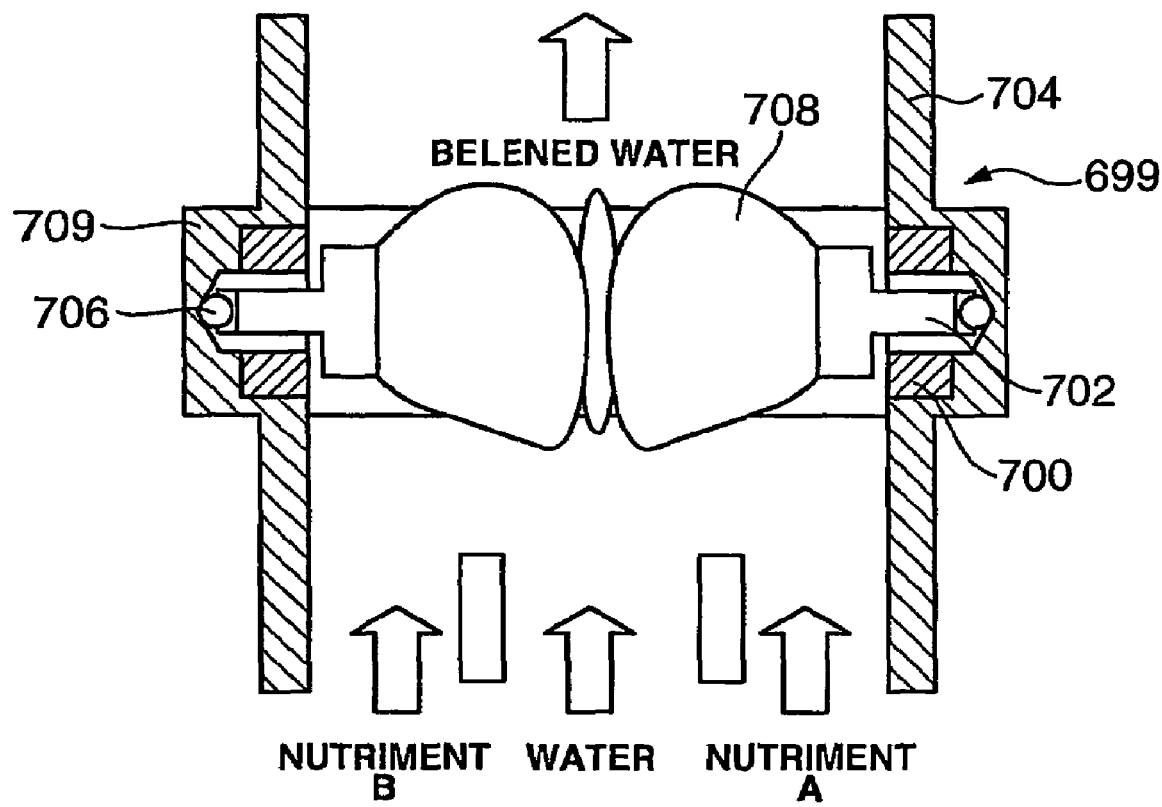

The above pump shown in FIG. 21 can also be used as shown in FIG. 22, in which the pump is arranged to discharge nutrient medium for plant. Plural types of nutrient A and B and water on an upstream side are blended together when they are obliged to flow through the opening 707 in response to the rotations of the rotor 702, and the blended water is discharged downstream.

FIGS. 23A and 23B to 25A and 25B show other examples of the fan unit according to the present embodiment, in which the foregoing fan unit 400 is further modified. For the sake of an easier understanding, the references employed in FIGS. 21 and 22 are used again to explain.

In the case of a fan unit 710 shown in FIGS. 23A and 23B, a housing 704 is formed into an almost cylindrical and short-axis shape to contain fins 708 therein. The fins 708 are disposed to rotate around a rotation shaft 711 placed at the radial center of the housing 704. The rotation shaft 711 is rotatably supported by a pair of bearings 712 disposed on both axial ends of the rotation shaft 711. On both axial sides of the housing 704, each bearing 712 is connected to the circumferential periphery of the housing 704 by three support bars 713. The remaining components are identical or similar in configurations and operations to those in FIGS. 21 and 22. Hence, the fins 708 can be rotated around the central rotation shaft 712 on the basis of the same principle as the foregoing. Since the fins 708 are supported by the central rotation shaft 712, the support structure for the fins 712 can be simplified.

The structure in FIGS. 23A and 23B can further be modified that shown in FIGS. 24A and 24B. This structure is almost similar to those in FIGS. 23A and 23B, except that the first and second magnetic members with excitation coils 700 are formed in parallel with the axial direction of a fan unit 720. The third magnetic member with the permanent magnets 702 are inserted between the first and second magnetic members with excitation coils 700 and also in parallel with the axial direction. The fins 708 are coupled with the third magnetic member using L-shaped connections 721. Hence it is also possible for this fan unit 720 to operate in the same way as the foregoing.

In addition, the structure in FIGS. 25A and 25B is also a modified fan unit 730, in which there is a housing 731 formed into a rectangular shape, when viewed along the axial direction thereof. A rotation shaft 732 is arranged at the center, like the above in FIGS. 24A and 24B, but only one bearing 733 supports the rotation shaft 732. Thus, support bars connecting the bearing 733 and the housing 704 are arranged only one axial side of the housing 704. That is, the support on the one-sided bearing system is employed. Each of the first and second magnetic members with excitation coils 700 is divided into four sections each disposed at the four corners as shown in FIG. 25B. Hence it is also possible for this fan unit 720 to operate in the same way as the foregoing.

The present invention will not restricted to the constructions shown in the foregoing embodiments, but a person having ordinary skill in the art can create a variety of constructions adequately altered or deformed within the scope of the claims.

The invention claimed is:

1. A fan unit comprising:
    an electric rotary machine having a rotor and a control circuit for the rotor, said control circuit selectively switching between normal rotation and reverse rotation of the rotor;
    a fin structure unified with the rotor;
    a rotation mechanism for rotating the rotor,
    wherein said rotor is formed to be encircled by coils and have an opening at a central portion thereof in a direction along which the opening permits fluid to flow; and
    the fin structure is coupled with a peripheral portion of the opening so as to be unified with the rotor, the peripheral portion incorporating the rotation mechanism therein.

2. The fan unit according to claim 1, wherein the electric rotary machine is provided with a first magnetic member, a second magnetic member disposed to face the first magnetic member with a space therebetween, a third magnetic member disposed between the first and the second magnetic members and configured to relatively movable to both the first and second magnetic members in a predetermined direction in the space, wherein each of the first and second magnetic members has a plurality of electromagnetic coils which are current-excitable and disposed in order along each magnetic member so as to have relative differences in disposal pitches of both of the electromagnetic coils of the first magnetic members and the electromagnetic coils of the second magnetic member, and the third magnetic member has a plurality of permanent magnets magnetized to predetermined magnetic poles and disposed in order along the third magnetic member, the third magnetic member being unified with the fin structure so as to serve as the rotor.

3. The fan unit according to claim 2, further comprising exciting circuit means configured to supply excitation current to the electromagnetic coils of at least one of the first and second magnetic members.

4. The fan unit according to claim 3, wherein the exciting circuit means is configured to supply the excitation current to the electromagnetic coils of the first and second magnetic members, the excitation current being set to give the same magnet pole to the electromagnetic coils of each of the first and second magnetic members.

5. The fan unit according to claim 4, wherein the excitation current supplied to the electromagnetic coils of the first magnetic member is different in phase from the excitation current supplied to the electromagnetic coils of the second magnetic member.

6. The fan unit according to claim 1, wherein each of the first, second and third magnetic members is formed into a circular arch shape.

7. The fan unit according to claim 1, wherein both of the first and second magnetic members are disposed with an equal spatial distance kept therebetween and the third magnetic member is located at a central position between first and second magnetic members.

8. The fan unit according to claim 1, further comprising a support device rotatably supporting the rotor, the support device being disposed at a rotational center of the rotor.

9. The fan unit according to claim 1, wherein the fin structure is formed to have a hole at a center of the fin structure.

10. The fan unit according to claim 1, further comprising a support device rotatably supporting the rotor, the support device being disposed around a peripheral portion of the rotor.

11. The fan unit according to claim 1, wherein the electric rotary machine is an electric motor.

12. The fan unit according to claim 1, wherein the electric rotary machine is an electric generator.

13. A heat exchange system having a compressor for a heat exchange medium, the compressor including the fan unit according to claim 1.

\* \* \* \* \*